United States Patent [19]

Boyd

[11] Patent Number: 4,573,525

[45] Date of Patent: Mar. 4, 1986

[54] THERMALLY ACTUATED HEAT EXCHANGE METHOD AND SYSTEM

[76] Inventor: Hermon Boyd, Rte. 3, Box 73JJ, Red Oak, Tex. 75154

[21] Appl. No.: 716,992

[22] Filed: Mar. 28, 1985

[51] Int. Cl.[4] .............................................. F28D 15/00
[52] U.S. Cl. ........................... 165/104.22; 165/104.29; 417/209; 126/434
[58] Field of Search ................... 165/104.22, 104.29; 417/209; 126/433, 434

[56] References Cited

U.S. PATENT DOCUMENTS

| | | | |
|---|---|---|---|
| 2,518,621 | 8/1950 | Hull et al. | 417/209 |
| 4,246,890 | 1/1981 | Kraus et al. | 165/104.29 |
| 4,270,521 | 6/1981 | Brebbe | 165/104.29 |
| 4,552,208 | 11/1985 | Sorensen | 165/104.22 |

FOREIGN PATENT DOCUMENTS

| | | | |
|---|---|---|---|
| 35288 | 2/1982 | Japan | 165/104.21 |

Primary Examiner—Albert W. Davis, Jr.

[57] ABSTRACT

An improved heat actuated heat exchange system having conduit in a primary heating zone, a boiler in a second heating zone, and an accumulator in a third heating zone operatively connected by other conduits to a condenser, two check valves, and a heat rejector to form an hermetically sealed device containing a condensible coolant. The coolant, which is initially heated in the primary heating zone, is flashed into vapor in the boiler to produce a vapor piston for pumping heated liquid through a check valve and into a hot accumulator. Vapor pressure in the accumulator is the motive force for circulating heated coolant through the heat rejection zone, through the second check valve, and back into the primary heating zone. Check valves are utilized as pressure isolators and determine the direction of fluid flow. The system can be utilized on energy conservation devices such as solar energy systems or heat reclaim systems as the device is receptive to most heat sources with a generally uniform distribution.

6 Claims, 4 Drawing Figures

THERMALLY ACTUATED HEAT EXCHANGE METHOD AND SYSTEM

FIELD OF INVENTION

This invention relates to heat actuated heat exchange devices and specifically to an improved method relying on vapor pressure gradients to induce flow of liquid coolant through heat absorbing and heat rejecting zones. In one aspect, the invention relates to a device for radiant heat absorption. In another aspect, the invention relates to a device for convective heat absorption. In either aspect, the process is identical, but the heat absorption assembly is matched to the heat source.

DISCUSSION OF PRIOR ART

Heretofore, heat exchange has normally been accomplished utilizing an electromechanical system comprised, in part, of costly pumps, sensors, valves, and controllers, all of which require an electrical energy source. Due to the variety and number of components which are critical to its proper operation, the electromechanical system requires frequent monitoring and maintenance.

Among heat exchange systems which do not utilize electromechanical components are heat actuated systems such as the heat pipe and the thermosyphon, and systems characterized by geyser action, vapor collection, or regenerative cycles. Practical utilization of heat pipes is normally limited to short distances since return of condensate is accomplished by capillary action or by gravity. Thermosyphon systems transfer heat when a heated fluid is caused to flow by the density differential created by temperature gradients. The resultant flow rate is relatively slow in a thermosyphon system and heat rejection must occur at a higher elevation than heat absorption. Heat exchange accomplished by geyser action as disclosed in U.S. Pat. No. 4,478,211 depends on the production of differences in liquid levels to create a hydrostatic pressure imbalance which promotes flow of a heated liquid. Motive forces in the geyser system are limited by the elevation differences between the inlet and exit of the heated riser tube. Vapor collection systems such as disclosed in U.S. Pat. No. 2,755,792 have complex piping arrangements, and often depend on a specialized heat source to cause liquid flow. Regenerative cycles such as the system disclosed in U.S. Pat. No. 3,929,305 are sensitive to input heat position and distribution.

OBJECTS OF THE INVENTION

Accordingly it is an object of my invention to provide a hermetically sealed heat exchanger system containing a condensible fluid coolant which is recirculated without electromechanical means.

It is a further object to provide such a system which utilizes a portion of the available heat to produce motive forces for coolant recirculation.

Further objects of this invention are to provide such a system for the transfer of heat to remote sites without sensitivity to the relative elevation of the heat absorber and heat rejector, and to utilize simplified piping and heat absorber arrangements which produce vapor pressure gradients, providing the dominant motive force for coolant recirculation.

Another object is to provide such a system with a finned heat absorber arrangement such that the heat source may be generally evenly distributed along said absorber and may be of varied origin.

It is also an object to provide such a system with a minimal number of simplified moving components to promote a long useful life with low maintenance.

Further objects and advantages of my invention will become apparent from a consideration of the drawings and ensuing description thereof.

DESCRIPTION OF INVENTION

Figure 1:
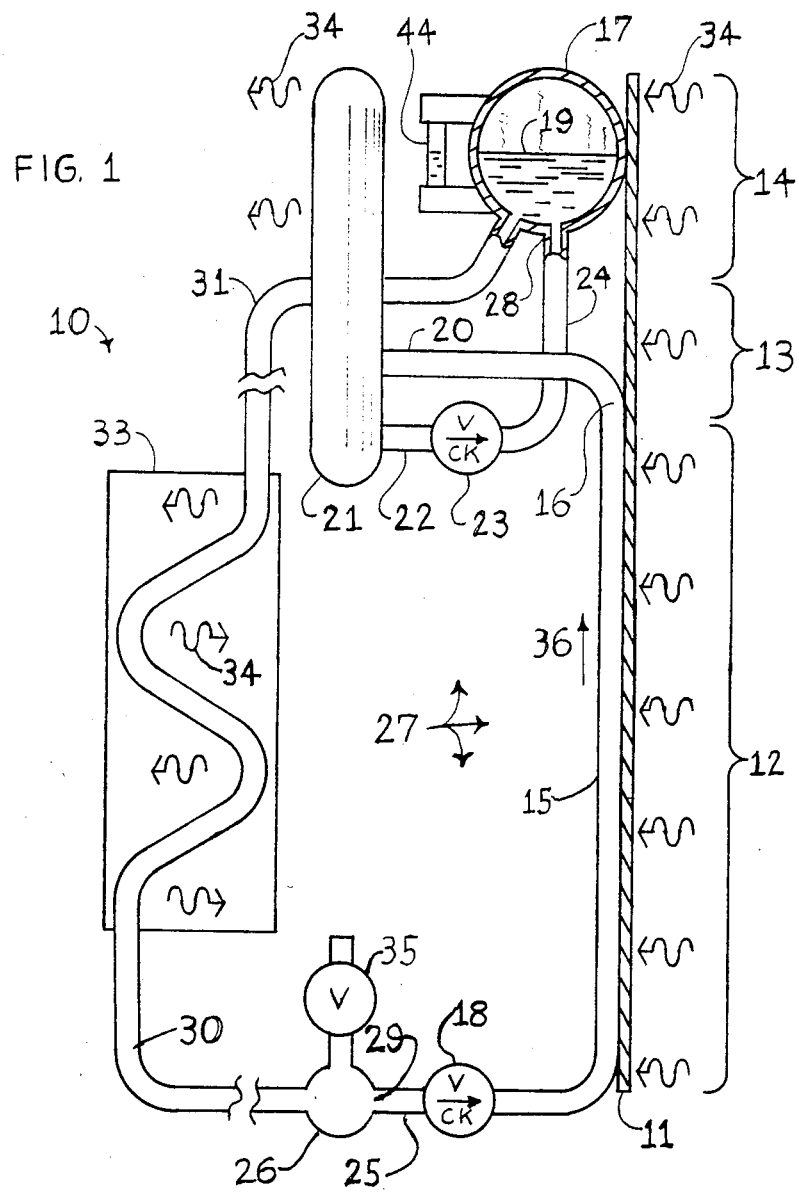
FIG. 1 is a diagrammatic view, partly in section, of a heat exchange system which utilizes part of the available heat to cause the coolant to flow.

Referring with more particularity to the drawings, wherein like reference characters designate like or corresponding parts throughout the several views, there is shown in FIG. 1 a heat exchange system generally designated 10, which embodies the principles of the present invention.

The heat exchange system 10 includes a heat absorbing fin 11, functionally divided into a primary heating zone 12, a boiler zone 13, and an accumulator heating zone 14. The heat absorbing fin 11, which could be flat or could be the surface of a vessel or conduit, is preferably formed of sheet material of relatively high thermal conductivity such as copper, aluminum, or steel, and is in thermal communication with the riser tube 15, the flash boiler 16, and the accumulator 17.

Figure 2:
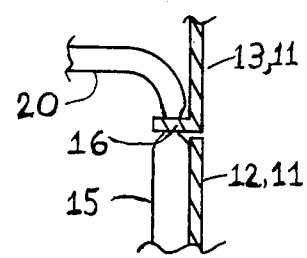
FIG. 2 is a fragmentary view, partly in section, showing an alternate embodiment of the flash boiler and of the heat absorbing fin in the boiler zone.

Specialized surface treatments, which are generally known to those practicing in the art, can be applied to the heat absorbing fin 11 to enhance the radiation absorption characteristics. In one embodiment, the primary heating zone 12 is in thermal communication with the boiler zone 13. In another embodiment, as depicted in FIG. 2, the primary heating zone 12 is not in thermal communication with the boiler zone 13. In either embodiment, the boiler zone 13 is in thermal communication wtih the accumulator heating zone 14.

The primary heating zone 12 is generally described as the part of the heat absorbing fin 11 which is in thermal communication with, and contributes heat to the riser tube 15.

The boiler zone 13 is generally described as the part of the heat absorbing fin 11 which is in thermal communication with the flash boiler 16 and, as a result of thermal gradients, contributes heat to the flash boiler 16.

The accumulator heating zone 14 is generally described as the part of the heat absorbing fin 11 which is in thermal communication with the accumulator 17 and, because of thermal gradients, contributes heat to the accumulator 17.

It is recognized that the boundaries of the said heating zones are dynamic in nature although the zones themselves remain generally fixed in relation to one another.

The riser tube 15 is a conduit, preferably of a relatively high thermal conductivity metal, which, at one end, is integrally connected to the lower check valve 18 and at the other end is integrally connected to the flash boiler 16 in a configuration which provides continuous fluid communication between the lower check valves and the flash boiler 16.

The flash boiler 16 is preferably formed of metal conduit such as copper or other material with relatively high thermal conductivity. In one embodiment, as indicated in FIG. 2, the flash boiler 16 is a conduit of variably smaller inside volume than the riser tube 15, and of sufficient length to insure that the volume of liquid coolant 19 in the flash boiler 16 will, when vaporized, completely fill the vapor piston tube 20 and extend into the vapor separator/condenser 21. In another embodiment, as shown in FIG. 1, the flash boiler 16 is a continuation of the riser tube 15, having the same diameter and being constructed of like material. The flash boiler 16 provides continuous fluid communication between the riser tube 15 and the vapor piston tube 20.

The vapor piston tube 20 is a conduit integrally connected at one end to the flash boiler 16 and at the other end to the vapor separator/condenser 21 in a configuration that provides continuous fluid communication between the flash boiler 16 and the vapor separator/condenser 21. The inside diameter of the vapor piston tube 20 is smaller than the greatest possible vapor bubble diameter of the coolant 19. The vapor bubble size is a property of the fluid and can be estimated according to methods commonly found in references on boiling heat transfer. The volume of the vapor piston tube 20 is limited by the volume of vapor which can be produced from the liquid coolant 19 in the flash boiler 16. The flash boiler 16 must produce a volume of vapor which equals or exceeds the volume of vapor piston tube 20, plus part of the volume of the vapor separator/condenser 21, plus the volume of vapor which is condensed in the vapor piston tube 20 before vapor collapse in the vapor separator/condenser 21.

The vapor separator/condenser 21 is integrally connected to the vapor piston tube 20 and to a condenser connection conduit 22 in a configuration that provides continuous fluid communication between the vapor piston tube 20 and the condenser connection conduit 22. The vapor separator/condenser 21 is generally a variably dimensioned device of a closed configuration except at the connections to the vapor piston tube 20 and the condenser connection conduit 22, which are generally located at the bottom of the vapor separator/condenser 21. The vapor separator/condenser 21 is preferably constructed of a thermally conductive material such as copper, aluminum, or steel, and is so constructed that vapor coolant 19 entering the bottom from the vapor piston tube 20 impinges on low velocity liquid coolant 19 in a tube of dimension larger than the greatest bubble diameter. Upon exposure to the low velocity liquid 19, the vapor begins to rise and to collapse as heat from the vapor is absorbed into the liquid. The vapor separator/condenser 21 has its upper portion exposed to ambient surroundings which allows the rejection of heat from condensation.

The condenser connection conduit 22 is integrally connected to the vapor separator/condenser 21 and to the upper check valve 23 in a configuration that provides continuous fluid communication between the vapor separator/condenser 21 and the upper check valve 23. Since the upper check valve 23 and lower check valve 18 are of design and function which is well understood by those familiar with the design and fabrication of hydraulic devices, a detailed description is omitted in the interest of brevity. It suffices, however, to understand that the upper check valve 23 responds to pressure by allowing the coolant 19 to flow through when pressure in the condenser connection conduit 22 is greater than pressure in the accumulator connection conduit 24.

Accumulator connection conduit 24 provides fluid communication between, and is integrally connected to the upper check valve 23 and the accumulator 17. However, when pressure in the accumulator connection conduit 24 is greater than pressure in the condenser connection conduit 22 the upper check valve 23 acts to stop fluid flow and provides an effective pressure barrier. Likewise the lower check valve 18 opens and allows coolant 19 to flow when pressure in the lower connector 25 is greater than the pressure in the riser tube 15.

The lower connector 25 provides fluid communication between, and is integrally connected to the distribution header 26 and the lower check valve 18. When pressure in the riser tube 15 is greater than pressure in the lower connector 25, the lower check valve 18 acts to stop coolant 19 from flowing and acts as an effective pressure barrier.

The pulsed vapor pump, generally designated 27, shall be generally defined as the lower connector 25, the lower check valve 18, the riser tube 15, the flash boiler 16, the vapor piston tube 20, the vapor separator/condenser 21, the condenser connection conduit 22, the upper check valve 23, and the accumulator connection conduit 24, all taken collectively in the configuration previously disclosed.

In one embodiment the heat exchange system 10 is constructed with a single pulsed vapor pump 27 with its discharge port 28 integrally connected to the accumulator 17, providing fluid communication between the upper check valve 23 and the accumulator 17. The intake port 29 of the single pulsed vapor pump 27 is integrally connected to the return conduit 30, and provides fluid communication between the return conduit 30 and the lower connector 25.

In another embodiment, the heat exchange system 10 is constructed with a plurality of pulsed vapor pumps 27 which are assembled in parallel with all discharge ports 28 integrally connected to a single accumulator 17, allowing fluid communication between all pulsed vapor pumps 27 and the accumulator 17. All intake ports 29 are integrally connected to the distribution header 26, providing fluid communication between the distribution header 26 and the said plurality of pulsed vapor pumps 27. It should be noted that the plurality of pulsed vapor pumps 27 are all in thermal communication with the heat absorbing fin 11, as indicated in FIG. 1. Return conduit 30 is integrally connected with the distribution header 26.

Referring again to FIG. 1, the accumulator 17 is a closed, variably dimensioned vessel integrally connected to, and providing fluid communication between the accumulator connection conduit 24 and the supply conduit 31. The accumulator 17 is preferably made of a highly heat conductive material such as copper, steel, or aluminum.

An optional embodiment of the accumulator 17 includes a sight glass 44, whose design and function is well understood by those familiar with the design and function of hydraulic devices. The accumulator 17 is dimensioned to provide enough volume for variations in liquid coolant 19 volume caused by temperature changes and to provide additional volume for vapor storage. A sight glass 44, of design and construction generally known by those familiar with hydraulic devices, is an optional embodiment which allows visual indication of the liquid coolant 19 level in the accumulator 17.

The heat rejector 33, any convenient means for removing heat from the system, such as a water tank, is integrally connected to and provides fluid communication with the supply conduit 31 and the return conduit 30.

For the sake of clarity, thermal insulation is not indicated in the drawings, but is required on the outside of all system surfaces except where heat is received or is rejected, as indicated by wavey arrows 34. Surfaces which are not insulated include the heat receiving side or sides of the heat absorbing fin 11, the upper portion of the vapor separator/condenser 21, and inside the heat rejector 33.

Service valve 35 is any convenient type of the many designs well understood by those familiar with the design of hydraulic devices. Direction of fluid flow is indicated by arrow 36.

An important consideration of the heat exchange system 10 is that a component of the resultant acceleration forces such as gravity, must extend from upper to lower on any component which is so described.

Figure 3:
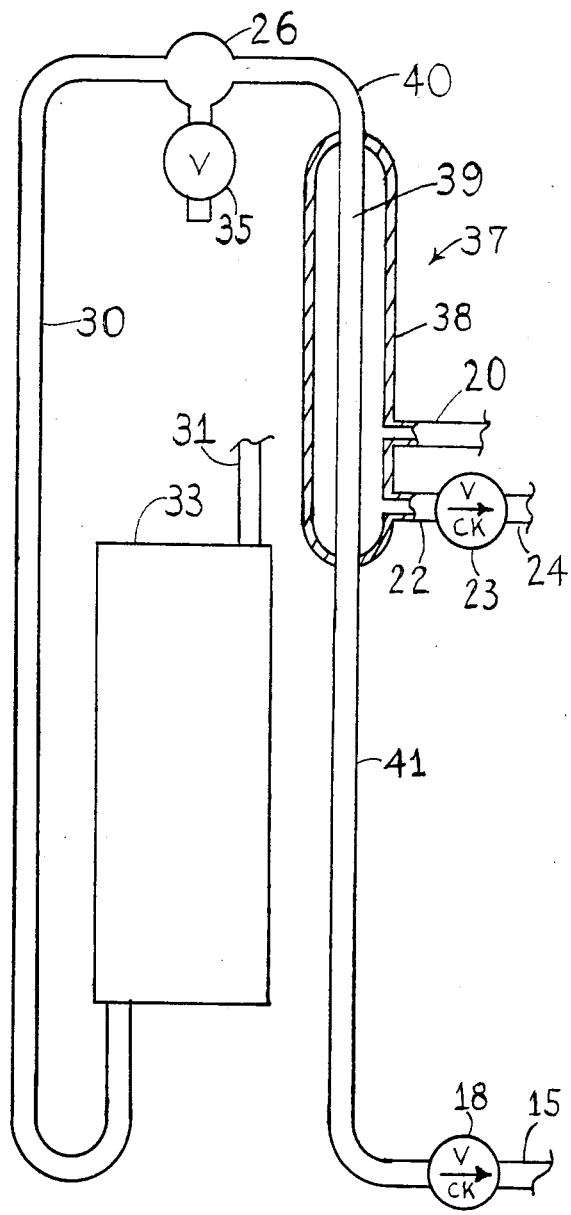
FIG. 3 is a fragmentary diagrammatic view, partly in section, of the heat exchange system of FIG. 1, except modified to cool the vapor separator/condenser with coolant returning from the heat rejector.

FIG. 3 illustrates a heat exchange system very similar to the system of FIG. 1, but indicates an alternate embodiment of the vapor separator/condenser 21, which in FIG. 3 is generally designated 37. The vapor separator/condenser 37 is comprised of a conduit 38 concentrically sealed around a smaller conduit 39 which is integrally connected to and and provides fluid communication between the condenser connecting tube 40 and the lower check valve connecting tube 41. The condenser connecting tube 40 is integrally connected to and provides fluid communication with the distribution header 26. The lower check valve connecting tube 41 is integrally connected to and provides fluid communication with the lower check valve 18.

Figure 4:
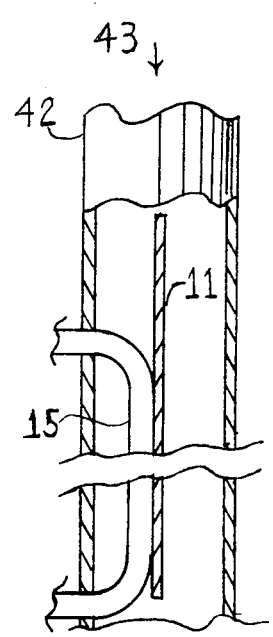
FIG. 4 is a fragmentary diagrammatic view, partly in section, of the heat exchange system of FIG. 1, except modified to utilize heat from a fluid flowing through a conduit.

FIG. 4 illustrates an alternate embodiment of the heat exchange system 10 in that the heat absorbing fin 11 is contained inside conduit 42 through which hot fluids are flowed, preferably in the direction indicated by the arrow 43. In one embodiment, the heat absorbing fin 11 may be generally flat. In another embodiment, the heat absorbing fin 11 may have surface irregularities which enhance convective heat transfer.

OPERATION OF INVENTION

With the heat exchange system 10 assembled in the manner herein before described, it is prepared for operation by first evacuating through service valve 35 and then loading with an amount of condensible coolant 19 which will partially fill the accumulator 17 while the system is in operation. Determining the correct volume of coolant 19 to be loaded can be done by weight if the internal volume of the heat exchange system 10 and of the accumulator 17 is known. Preferably coolant 19 volume can be determined by monitoring a sight glass 44 during operation to verify that the accumulator 17 is only partially filled.

When the system is not operating, the vapor volume forms in the warmest part of the system or, if thermal gradients are not great enough, at the highest point in the system. When a generally uniform source of heat is applied to the heat absorbing fin 11, the fin increases in temperature and conducts heat to those parts of the system which are in thermal communication with said fin. The fin in the primary heating zone 12 conducts heat to the riser tube 15, which in turn conducts heat to the coolant 19 inside said riser tube 15. As heat is conducted to the coolant 19, the temperature rises and the density of the coolant decreases. Heat applied to the boiler zone 13 increases the temperature in said zone. Heat is conducted through the fin to the flash boiler 16 and in turn to the coolant 19 inside the flash boiler 16. Thus the temperature of the coolant 19 in the flash boiler 16 increases. Heat applied to the accumulator heating zone 14 increases the temperature of said zone. The fin conducts heat to the accumulator 17 and the accumulator 17 in turn conducts heat to the coolant 19 inside the accumulator 17. The temperature of the coolant 19 begins to increase inside the accumulator 17.

At this juncture, it should be reviewed that the vapor pressure of a condensible fluid, herein referred to as coolant 19, contained inside an hermetically sealed vessel, herein referred to as heat exchange system 10, increases as the temperature increases. The result is that vapor pressure is greatest where the temperature is highest.

It should also be pointed out that the rate at which the temperature of a given mass of fluid increases is generally directly related to the amount of heat added per unit of fluid. Applying this principle to the heat exchange system 10, please note that the rate of temperature increase of the coolant 19 in the riser tube 15 is less than the rate of temperature increase in the flash boiler 16. Also the rate of temperature increase in the accumulator 17 is less than the rate of temperature increase in the riser tube 15. It can be appreciated that as heat is generally applied uniformly over the heat absorbing fin 11, then the amount of heat applied to any part is generally directly related to the area of fin which has thermal influence on that part. Extending the argument, the rate of temperature increase can be generally approximated by the ratio of fin area to volume of liquid coolant 19 thermally influenced by said fin area. For example, the ratio of the area of the accumulator heating zone 14 to the volume of liquid coolant 19 in the accumulator 17 is less than the ratio of the area of primary heating zone 12 to the volume of liquid coolant 19 in the riser tube 15 which is less than the ratio of the area of the boiler zone 13 to the volume of liquid coolant 19 in the flash boiler 16. Therefore, the coolant 19 in the flash boiler 16 increases in temperature faster than the coolant 19 in the riser tube 15, and faster in the riser tube 15 than in the accumulator 17.

As heat is initially applied to the heat absorbing fin 11, temperature in the flash boiler 16 increases fastest and soon becomes the warmest spot in the heat exchange system 10. The coolant 19 inside the flash boiler 16 is also the warmest coolant 19 inside said system. Thus the vapor pressure of the coolant 19 inside the flash boiler 16 is greater than the vapor pressure of any other location in the heat exchange system 10. The greater vapor pressure produces a vapor bubble which grows in volume as heat is continuously added to the coolant 19, which boils in the flash boiler 16. The diameter of the vapor bubble quickly expands to the inside diameter of the vapor piston tube 20. Continued boiling increases the volume of vapor. As the vapor volume expands in the vapor piston tube 20, vapor in other parts of the system is displaced and caused to collapse into liquid.

If vapor exists in the vapor separator/condenser 21 when heat is initially applied to the heat absorbing fin 11, the vapor volume created in the vapor piston tube 20 will generally displace a similar volume of vapor in the vapor separator/condenser 21 and cause the displaced volume to collapse into liquid. As coolant 19 in the flash boiler 16 continues to boil, vapor volume in the vapor piston tube 20 continues to increase, and vapor in the vapor separator/condenser 21 continues to collapse into liquid coolant 19. The liquid coolant 19 inside the vapor piston tube 20 is pushed ahead of the growing vapor bubble and enters the vapor separator/condenser 21. The increasing volume of vapor coolant 19 in the vapor piston tube 20 cannot cause coolant 19 to flow from the flash boiler 16 into the riser tube 15 because of the herein before described action of the lower check valve 18 which allows flow of coolant 19 only in the direction from the flash boiler 16 toward the vapor separator/condenser 21. Finally, the growing vapor bubble extends the entire length of the vapor piston tube 20 and beyond into the vapor separator/condenser 21.

The diameter of the vapor separator/condenser 21 is much larger than the maximum vapor bubble size as herein before discussed, thus allowing the vapor coolant 19 to freely rise toward the top of the vapor separator/condenser 21. As the vapor coolant 19 impinges on the cooler liquid coolant 19 inside the vapor separator/condenser 21, the heat in the vapor is absorbed into the liquid coolant 19 and the vapor bubble collapses. As the vapor bubble collapses inside the vapor separator/condenser 21, additional vapor is produced in the flash boiler 16 until liquid coolant 19 is no longer present in the flash boiler 16. The net effect is that vapor is being produced in the flash boiler 16 at the same rate that vapor is being absorbed in the vapor separator/condenser 21 until all coolant 19 in the flash boiler 16 has been vaporized.

When the flash boiler 16 is void of liquid coolant 19, vapor begins to form at that place where liquid coolant 19 is warmest. The warmest coolant 19 is now in the riser tube 15 where liquid coolant 19 now boils into vapor form. As the boiling and condensing process continues, a hydraulic pressure imbalance is produced as a result of both a density gradient created by liquid temperature variations and a difference in hydraulic height created when vapor is produced in the riser tube 15. The density gradient phenomenon is identical to the thermosyphon process which is well understood by those who are knowledgeable and skilled in the art of hydraulic heat exchange. In the interest of brevity the thermosyphon process is not further explained here, but it is noted that fluid flow and heat exchange is accomplished. The hydraulic height differential created by the boiling process also provides motive force which induces flow in the same direction as the thermosyphon effect. The two motive forces are additive and cause coolant 19 to flow in the direction indicated by the arrow 36.

When the coolant 19 flows it pushes vapor in the vapor piston tube 20 before it, causing the vapor to enter the vapor separator/condenser 21 and collapse. Under the influence of the hydraulic pressure imbalance, heated fluid begins to circulate through the heat exchange system 10. Heated coolant 19 flows from the vapor separator/condenser 21 through the condenser connecting conduit 22, and into the upper check valve 23. The upper check valve 23, responding to a pressure differential which is greater from the vapor separator/condenser 21, opens and allows heated coolant 19 to flow through the accumulator connection conduit 24 and into the accumulator 17. The coolant 19 which was previously in the accumulator 17 was already being heated through the influence of the accumulator heating zone 14, and gets mixed with entering heated coolant 19. The fact that coolant 19 enters the accumulator 17 after being heated by both the primary heating zone 12 and the boiler zone 13, and then gets additional heat added in the accumulator 17, insures that eventually the coolant with the warmest average temperature will be in the accumulator 17. In addition, the highest vapor pressure will be in the accumulator 17 with the result that vapor in other parts of the heat exchange system 10 will collapse because of lower vapor pressure.

Warmed coolant 19 flows from the accumulator 17 through the supply conduit 31 and into the heat rejector 33. In the heat rejector 33 heat is absorbed from the coolant 19, resulting in lower coolant 19 temperatures. The cooled coolant 19 flows from the heat rejector 33 through the return conduit 30 and into the distribution header 26. From the distribution header 26 the coolant 19 flows through the lower connector 25, through the lower check valve 18, and into the riser tube 15.

Relatively cool liquid coolant 19 is introduced into the riser tube 15 and coolant 19 which is previously warmed in the riser tube 15 is introduced into the flash boiler 16 and vapor piston tube 20. Once again the coolant 19 in the boiler vaporizes. This initial warm up process continues in a manner which is partially a cyclic and partially a dynamic process which is driven by the changing temperatures and pressures as both temperatures and pressures begin to approach the operating conditions which will become apparent from the description below. It should be noted at this juncture that heat absorbed in the condensation process is rejected to the ambient by the vapor separator/condenser 21.

When temperatures and pressures generally approach the normal operating conditions the heat exchange process becomes cyclic. At the beginning of the cycle, all vapor coolant 19 is in the accumulator 17 and occupies only part of the accumulator 17 volume. Liquid coolant 19 fills the rest of the system. Recall that generally the coolant 19 temperature is highest in the accumulator 17 and coolest after it exits the heat rejector 33. Coolant in the flash boiler 16, which has been previously heated in the riser tube 15, heats relatively quickly due to the fin area to liquid volume ratio as explained herein before. The vapor pressure in the flash boiler 11 exceeds the vapor pressure in the accumulator 17 when the temperature in the flash boiler 16 exceeds the temperature in the accumulator 17. When this occurs, a vapor bubble is formed which fills the inside diameter of the vapor piston tube 20, and as more coolant 19 vaporizes in the flash boiler 16, the bubble forms a vapor piston which forces a slug of liquid coolant 19 into the vapor separator/condenser 21. As the vapor piston is pushing the coolant 19 slug into the vapor separator/condenser 21, coolant 19 is forced to leave the vapor separator/condenser 21 through the condenser connection conduit 22, the upper check valve 23, and the accumulator connection conduit 24. The displaced coolant 19 is deposited in the accumulator 17. The vapor volume in the accumulator 17 decreases by an amount equal to the volume of the vapor in the flash boiler 16, the vapor piston tube 20, and the vapor separator/condenser 21 taken collectively. The vapor bubble enters the vapor separator/condenser 21 after displacing all the liquid coolant 19 which was in the vapor piston tube 20. Inside the vapor separator/condenser 21 the vapor bubble begins to rise and to collapse at the same time. The rate of vapor collapse is greater than the rate of vapor production, especially after all the coolant 19 in the flash boiler 16 is vaporized.

Since the pressure on the condenser side of the upper check valve 23 is now a function of riser tube 15 temperature, and since, during normal operation, the accumulator 17 temperature and hence pressure is always greater than the temperature and pressure in the riser tube 15, a pressure differential exists across said check valve 23. At this point in the cycle vapor exists in both the accumulator 17 and, because of lower pressure, in the riser tube 15, flash boiler 16, and vapor piston tube 20. The herein before described hydrostatic imbalance again provides some motive force, but a much more dominant motive force results from the pressure difference between vapor in the accumulator 17 and vapor in the pulsed vapor pump 27. This pressure differential causes hot coolant 19 to flow from the accumulator 17 through the conduit path herein before disclosed and into the heat rejector 33. In the heat rejector 33, coolant 19 temperature is lowered when heat is transferred from the coolant 19 into the heat rejector 33 apparatus. From the heat rejector 33, coolant 19 flows as herein before disclosed through the lower check valve 18 and into the riser tube 15. Vapor in the pulsed vapor pump 27 collapses as liquid coolant 19 enters and replaces vapor volume. Thus ends one cycle and the heat exchange system 10 is ready for the next cycle.

When the pulsed vapor pump 27 is used in singularity, all the coolant 19 in the heat exchange system 10 must start and stop with each cycle. The energy required to restart the liquid motion at each cycle can be saved by using a plurality of pulsed vapor pumps 27, assembled in parallel as herein before described. In the plurality embodiment, the pulsed vapor pumps 27 produce vapor pistons in alternation, each pump operating independently of all others. Thus, the vapor pressure difference between the accumulator 17 and at least one of the pulsed vapor pumps 27 exists at all times. Since the liquid flows continuously, energy is saved and the system is more efficient.

The amount of vapor produced by the flash boiler 16 can be controlled by altering the volume of coolant 19 which is influenced by the boiler zone 13, with a smaller liquid volume as depicted in FIG. 2 producing a smaller vapor volume, and a larger liquid volume producing a larger vapor volume.

Coolant 19 flowing from the heat rejector 33 can be used to cool the vapor separator/condenser 37, as depicted in FIG. 3. In this embodiment heat from condensation will be transferred to returning coolant 19 in conduit 39, instead of rejected to the ambient. This slightly warmed coolant 19 then flows into the pulsed vapor pump 27. Since condensation heat energy is not rejected, bur reabsorbed into the heat exchange system 10, efficiency can be improved.

The heat absorbing fin 11 can receive heat from a variety of sources. The heat exchange system 10 of FIGS. 1 and 2 is appropriate for absorbing radiant heat and could be used as the absorber in a solar collector or other applications wherein radiant energy is the mode of heat transfer.

Many times waste heat is found in conduits 42 with flowing fluids 43, such as heat in the discharge line of a refrigerated cooling system. In such cases the heat absorber 11, modified to enhance convective heat transfer, can be mounted in the conduit 42.

Although the invention has been described relative to a particular embodiment thereof, there are obviously numerous variations and modifications readily apparent to those skilled in the art in the light of the above teachings. It is therefore to be understood that the invention may be practiced otherwise than as specifically described.

What is claimed as new and desired to be secured by Letters Patent of the United States is:

1. A heat actuated self pumping heat exchange system comprising:
    a heat absorbing means for receiving radiant heat energy of a generally uniform distribution;
    said heat absorbing means operatively divided into a primary heating zone, a boiler zone, and an accumulator heating zone, all in thermal communication;
    riser tube operatively affixed to said primary heating zone for thermal communication;
    flash boiling means operatively affixed to said boiler zone for thermal communication;
    accumulator operatively affixed to said accumulator heating zone for thermal communication;
    said riser tube operatively affixed to said flash boiling means for fluid communication;
    vapor piston tube in fluid communication with said flash boiler and a condensing means;
    said condensing means in thermal communication with heat rejecting means;
    said vapor piston tube of a diameter smaller than the maximum possible vapor bubble diameter;
    said condensing means in fluid communication with an upper means for preventing reverse flow of coolant in said condensing means and for providing a pressure separation;
    said upper means for preventing reverse flow in fluid communication with said accumulator;
    conduit means for conveying heated said coolant from said accumulator to a coolant cooling zone;
    said cooling zone removing heat absorbed by said coolant in said riser tube and in said flash boiling means and in said accumulator;
    a second conduit means in fluid communication with said cooling zone and with a lower coolant distribution means for conveying said coolant;
    a servicing means for evacuating the said system and charging with said coolant;
    said coolant with condensible fluid properties;
    a lower means for preventing said coolant reverse flow of said coolant in said riser tube in said lower coolant distribution means;
    said riser tube is in fluid communication with said lower means for preventing said coolant reverse flow;
    said heat absorbing means with optical coating means for enhancing absorptivity of said radiant heat;
    a singular vapor pulse pumping means comprises of said liquid discharge conduit means, said lower means for preventing reverse flow, said riser tube, said flash boiling means, said vapor piston tube, said condensing means, and said upper means for preventing reverse flow.

2. The system claimed in claim 1 with a plurality of said vapor pulse pumping means arranged in parallel.

3. The system claimed in claim 1 with said primary heating zone in thermal non-communication with both both said boiler zone and said accumulator heating zone.

4. The system claimed in claim 1 with a condenser heat reclaim means.

5. The system claimed in claim 1 with a convective heat absorbing means.

6. The system claimed in claim 1 wherein said second conduit means passes in heat exchange relationship with said condensing means before communicating with said lower coolant distribution means.

* * * * *